June 8, 1937.  J. B. THOMSON  2,083,249
PHOTOGRAPHIC METHOD AND PRODUCT RESULTING THEREFROM
Filed Dec. 20, 1935
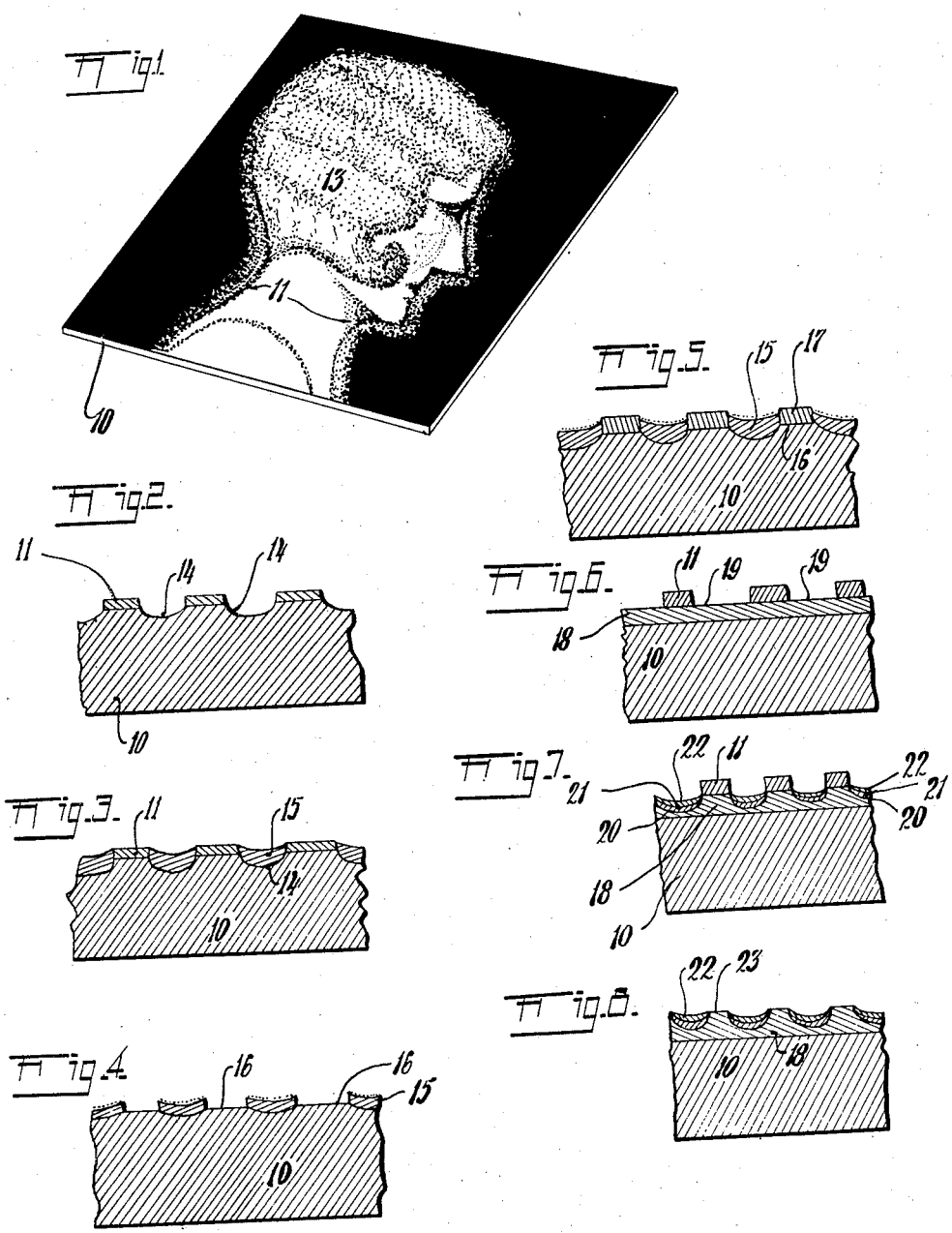
INVENTOR
Joseph B. Thomson
BY Brown & Jones
ATTORNEYS Patented June 8, 1937

2,083,249

UNITED STATES PATENT OFFICE 2,083,249

PHOTOGRAPHIC METHOD AND PRODUCT RESULTING THEREFROM

Joseph B. Thomson, Brooklyn, N. Y.

Application December 20, 1935, Serial No. 55,327

5 Claims. (Cl. 41—18)

This invention relates to photography and more specifically to a method for producing a photograph and the product resulting therefrom.

In general it is an object of the invention to provide a method and product of the character described which will efficiently perform the purposes for which they are intended, which method is simple and economical and which may be expeditiously and conveniently followed, and which product may be readily and sturdily usable.

Another object of the invention is to provide a photograph made entirely of metal, i. e., a photograph of which at least the face is of metal.

Another object is to provide a colored, metallic photograph; to provide a metallic photograph having strongly contrasting light and dark areas; and to provide a metallic photograph having certain areas raised with respect to certain other areas.

Other objects of the invention will in part be obvious and will in part appear hereinafter.

The invention accordingly comprises the several steps and the relation of one or more of such steps with respect to each of the others, and the article possessing the features, properties and the relation of elements, which are exemplified in the following detailed disclosure, and the scope of the application of which will be indicated in the claims.

For a fuller understanding of the nature and objects of the invention reference should be had to the following detailed description taken in connection with the accompanying drawing, in which:

Figure 1 is a perspective view of a product in one of the initial stages of manufacture by a method which exemplifies one form of the invention;

Fig. 2 is a representative cross section of a small part of the product shown in Fig. 1;

Figs. 3 and 4 are views similar to, and of stages subsequent to the stage shown in, Fig. 2;

Fig. 5 is a view, similar to Fig. 2, of the final product.

Fig. 6 is a view similar to Fig. 2 of a product undergoing a method which is a modification of the method to which the product shown in Figs. 1–5 is subjected;

Fig. 7 is a view similar to, and of a stage subsequent to the stage shown in, Fig. 6; and Fig. 8 is a view similar to Fig. 6, of the final product derived from the intermediate product shown in Fig. 6.

In general the present method is concerned with the building up photographically of a picture in which the lights and shades are obtained by the use of different metals or of metal in different physical or chemical condition. The darker metal may be applied or rendered dark before the light-colored metal is applied or caused to appear light-colored, and vice versa.

In the drawing, 10 represents a conducting sheet, preferably of relatively non-rusting material such as copper, brass, aluminum, etc. A layer 11 of light-sensitive material, such as light-sensitive enamel, is applied to one face of the copper sheet 10 and then exposed to light behind a negative which has previously been prepared with the aid of a fine mesh screen or a half-tone negative. The exposed layer 11 is developed and washed so that those portions, which were hidden by the negative from the light, are dissolved away. The enamel positive which remains may be heated to toughen it. The surface of the positive is thus covered by an assemblage of hard enamel dots 12 corresponding to the screen of the negative. They form the shadows of the picture and in some portions, of course, form almost a continuous surface. They are shown in black in Fig. 1, the white portions 13 being the copper which shows where the unexposed enamel has been dissolved away.

The metal exposed between the hardened enamel areas is next treated so that the surface between the hardened enamel areas will appear to be of a predetermined color. For present purposes, black and white are considered colors. In obtaining this color the plate may be etched as at 14, among other reasons the better to electroplate thereon, with a material suitable for etching layer 10. The plate at this stage has the form shown exaggeratedly in Fig. 2. It is then electroplated in such a fashion and with such a metal as to appear, for example, white. Tin may be used for this and is shown at 15 in Fig. 3. It deposits only on the copper exposed at the areas 14.

The hardened enamel may next be removed with a removing agent. A hot hydroxide, KOH, may be used for this. (See Fig. 4.)

The portions 16 of the surface of metal 10 which were beneath the hardened enamel may be treated so as to be of a different color from the color of the areas which were not beneath the hardened enamel. This may be accomplished by covering the white areas 15 with a non-conductor (see stippling in Fig. 4) and then depositing, as by electrodeposition, a metal of such a nature and in such a fashion as to leave a black deposit. Nickel may be used for this purpose. The nickel 17, Fig. 5, is thus substituted for the hardened enamel 11. Asphaltum or dragon's blood is a suitable non-conductor and is adapted to be brushed into the concave tops of the tin 15 before the plating on of the nickel and may be removed after that plating. Portions 13 of Fig. 1 are now covered by tin, which actually appears white, and the enamel portions or dots 11 of Fig. 1 (shown there in black) have been replaced with a black metal (black nickel). A prospective of the final product would appear like Fig. 1.

Instead of depositing nickel to represent the dark portions of the picture, the metal from which the hardened enamel has been removed may be darkened, for example, by the application to the plate of a solution which has a darkening effect on the metal of the layer 10 but not on the metal 13. A solution of copper carbonate in ammonia will darken brass.

If desired, the dark metal such as nickel, may be applied, e. g., electrodeposited in a layer 18 (Fig. 6), to the entire non-ferrous or non-rusting layer 10 before the application of the light-sensitive enamel 11. The latter is then exposed, developed and heated as before (see Fig. 6). The areas 19, which were protected by the negative from light and from which all enamel has been washed off, may, if desired, be subjected to an intermediate etching as at 20, Fig. 7 and a secondary deposit 21 of more black nickel with such surface texture as desired. At any event, in registry with or above the areas 19, a metal 22 of such a nature is deposited in such a way, and preferably in a thin coating, as to give an appearance of a predetermined texture and color. Tin gives a white color. The hardened enamel 11, which forms in part the photographic positive, may be removed with hot potassium hydroxide, leaving the black nickel exposed beneath, as at 23, Fig. 8. Thus again the shadows in the final photograph are represented by dark metal and the lights by white metal.

When tin and nickel are used, there is prepared a photograph the lights and shadows of which are formed of highly contrasting, differently colored metals.

A paper positive print may be made from the original negative. If the contours of the photograph are sharp, either the light or dark objects of the print may be cut out to form a die or a pattern, and vice versa, each with suitable backing. The die may then be placed against the similar pictorial matter of the metal photograph and on the face thereof. The pattern may be placed on the back of the photograph, its periphery being in registry with that of the die. The ensemble may be put in a press and subjected to pressure. Certain elements of the picture will be raised with respect to other elements. The principal object photographed may be raised with respect to the background.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which as a matter of language, might be said to fall therebetween.

Having described my invention, what I claim as new and desire to secure by Letters Patent, is:

1. A metallic, photographic, half-tone picture comprising a supporting plate of normally bright metal, those areas which are the lights of the picture having surfaces of an electro-deposited, different metal which is bright, the bottom of said last-mentioned metal being in cavities of, and below the surface of, said plate, those areas which are the shadows of the picture comprising metal and having a physical structure such that they absorb light and appear relatively black and being higher than the first-mentioned areas, the bright, deposited metal surfaces which are exposed being concave outward and presenting a multitude of bright, shallow, cup-like light reflectors protected from erasure by the higher adjacent dark areas.

2. A metallic, photographic, half-tone picture comprising a supporting plate of normally bright metal, a plurality of areas, which are the lights of the picture, having reflective surfaces of another metal, which surfaces are bright, said last-mentioned metal being deposited in cavities extending below the surface of said plate, and a second plurality of areas comprising relatively black metallic portions forming the shadows of the picture, one of said pluralities of areas being relatively higher than the other of said pluralities whereby protection against change and defacement of the lower plurality of areas is given by the higher plurality of areas.

3. A metallic, photographic picture comprising a metallic plate, relatively dark areas on said plate, said areas having surfaces comprising metal having a physical structure such that they appear black, and other relatively light areas on said plate, said light areas being depressed below said dark areas and having concave surfaces of other metal than the metal of said plate, said latter metal having a reflecting surface texture and appearing white.

4. A metallic, photographic picture comprising relatively dark areas, said areas having surfaces comprising metal having a physical structure such that they appear black, and other relatively light areas, said light areas being depressed below said dark areas and having concave surfaces of other metal than the metal of said dark areas, said latter metal having a reflecting surface texture and appearing white.

5. A process of forming a metallic, photographic picture comprising coating a sheet of metal with a light-sensitive resist, exposing said coated sheet behind a half-tone negative, developing the exposed resist, removing the unexposed resist, etching the resist-freed surfaces to produce in the surface of said metallic sheet a multiplicity of outwardly concave depressions, electro-depositing a metal adapted to give a light-reflecting, substantially white surface in the etched depressions, removing the exposed resist, and producing a substantially black surface on the portions of the metal sheet exposed by such removal without substantially affecting the electro-deposited white metal, said white metal being deposited to a depth and in a manner to produce multiplicities of outwardly concave surfaces below the darkened portions of said sheet.

JOSEPH B. THOMSON.